United States Patent
Shigeeda

(10) Patent No.: US 7,839,515 B2
(45) Date of Patent: *Nov. 23, 2010

(54) SECURED PRINTING SYSTEM

(75) Inventor: Nobuyuki Shigeeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

This patent is subject to a terminal disclaimer.

(21) Appl. No.: 11/851,893

(22) Filed: Sep. 7, 2007

(65) Prior Publication Data

US 2008/0002226 A1 Jan. 3, 2008

Related U.S. Application Data

(62) Division of application No. 10/616,936, filed on Jul. 11, 2003, now Pat. No. 7,443,527.

(30) Foreign Application Priority Data

Jul. 12, 2002 (JP) ............................. 2002-203578
Jun. 20, 2003 (JP) ............................. 2003-176032

(51) Int. Cl.
*G06K 15/00* (2006.01)
*G06F 3/12* (2006.01)

(52) U.S. Cl. .................................. 358/1.14; 358/1.15

(58) Field of Classification Search ................. 358/1.15, 358/1.13, 1.9, 1.14; 713/182, 189, 186; 709/225
See application file for complete search history.

(56) References Cited

U.S. PATENT DOCUMENTS

2003/0154413 A1 8/2003 Shigeeda .................... 713/202
2003/0163707 A1 8/2003 Shigeeda .................... 713/182

FOREIGN PATENT DOCUMENTS

| EP | 1217509 | 6/2002 |
| EP | 1380935 | 1/2007 |
| JP | 11146118 A | 5/1999 |
| JP | 2001-105690 | 4/2001 |
| JP | 2002-189579 | 7/2002 |
| WO | 0195185 | 12/2001 |

OTHER PUBLICATIONS

Search report, dated Oct. 22, 2007, in EP 03254413.
European Office Action in connection with Application No. 03-254-413.2-1245, dated Jul. 6, 2010.

*Primary Examiner*—Jerome Grant, III
(74) *Attorney, Agent, or Firm*—Fitzpatrick, Cella, Harper & Scinto

(57) ABSTRACT

In a secured printing system including an information processing apparatus and a printer, when the information processing apparatus issues a print job in a suspended state to the printer, the printer having accepted the print job suspends and holds the print job until release of suspension of job is instructed, and returns job designation information peculiar to the accepted print job to the information processing apparatus. The information processing apparatus writes the job designation information returned from the printer in a detachable storage medium. The printer reads out the job designation information from the detachable storage medium, in which the job designation information is written, and, then, releases the suspended state of the corresponding print job.

11 Claims, 5 Drawing Sheets

SECURED PRINTING SYSTEM

This application is a divisional application of co-pending application Ser. No. 10/616,936, now allowed, filed Jul. 11, 2003, which is incorporated herein by reference.

BACKGROUND OF THE INVENTION

1. Field of the Invention

The present invention relates to an information processing apparatus capable of remotely instructing printing by issuing a print job to a printing device connected via a predetermined network, the printing device, a printing system having the information processing apparatus and the printing device, a control method for the information processing apparatus, a control method for the printing device, a printing method for the printing system, programs for executing the printing method, and storage media.

2. Related Background Art

In recent years, in a system in which an information processing terminal such as a computer and a printing device are connected via a network, the Internet Printing Protocol (IPP) has been developed and attracting attention as a technique for causing the printing device to execute printing according to an instruction from the information processing terminal.

This specifies a communication procedure (protocol) for performing printing in a network printing device located in a remote place and organized by Printer Working Group (PWG) which is an international standardization organization related to printing. An initial version specification thereof is widely opened to the public as RFC2566 which is one of Internet standards according to the Internet Engineering Task Force (IETF).

In the IPP, a plurality of attributes for closely controlling various printer operations and job operations for printing and print jobs are specified.

For the printer operations, "Print-Job (printing execution)", "Get-Printer-Attributes (printer attributes acquisition)", "Get-Jobs (job list acquisition)", and the like are specified. In addition, for the job operations, "Cancel-Job (cancellation of job)", "Get-Job-Attributes (job state acquisition)", "Hold-Job (suspension of job)", "Release-Job (resumption of job)", and the like are specified. In this way, several kinds of processing for controlling start to end of printing are specified.

In addition, in order to designate a detailed setting for a printing device and to designate a detailed output form of a print, various attributes such as the number of copies, a finishing form, a print medium, and quality are specified.

Then, a user can designate an IPP operation after designating these IPP attributes in advance.

Note that the IPP is specified as a protocol for an application layer in a network architecture. It is specified that "HTTP V1.1" is used as a transport protocol.

Incidentally, as it has become easier for a user to perform control of a printing device and control from generation to completion of a job through a network, requirement has been increased for dealing with matters such as management of access to the printing device or control of access to a job by the user, and security on the network.

The IPP adopts an encryption communication system according to Transport Layer Security (TLS) as a method for guaranteeing security on the network.

The TLS logically constructs a secure channel, which utilizes an encryption technique, on a network connecting a client device (e.g., user PC) and a printing device. In addition, the TLS also has a mechanism for guaranteeing reliability of a client and a printing device utilizing a hierarchical digital certificate according to Public Key Infrastructure (PKI).

More secured remote printing can be realized by utilizing a client and a printing device in which the respective techniques of the IPP and the TLS are applied and implemented.

A general conventional example of the secured printing will be hereinafter described.

A user executes remote printing according to the IPP from his/her own personal computer (PC) or the like in advance. This can be performed according to the "Print-Job" operation and the like specified in the IPP.

A printing device is provided with an IPP server function and can accept the "Print-Job" operation. Then, after accepting the "Print-Job" operation, the printing device generates a print job.

With the IPP, a job URI is issued for each operation request in order to specify the generated print job and informs the user of the job URI as an IPP response. The printing device returns this job URI to the user who issued the operation. The user can designate the job URI in order to execute an operation (acquisition, cancellation, or the like of a job status) with respect to the job later.

In the case of the remote secured printing, printing is not processed immediately after a print operation is issued. A job is held in a state in which it is accumulated in a data spool area of the printing device. This is for preventing a print from being outputted before the user reaches the place where the printing device is located.

In addition, the IPP specifies predetermined attributes for realizing such processing. Moreover, since print data and IPP operations flowing on the network all go through a secured logical channel according to the TLS, there is no fear of leakage or the like of user information and print data.

Now, the print job held in the printing device is released as described below. That is, the user who issued the job URI goes to the front of the printing device and inputs a password on an operation panel of the printing device. The password is usually registered in the printing device as information peculiar to the user.

Upon succeeding in user authentication with the password, the user acquires his/her own job list from the operation panel. The "Get-Jobs" operation of the IPP is performed for the acquisition of the job list. Then, the user designates the job URI in the hold state, which was generated earlier, and designates release (resumption) of the job.

For this processing, the "Release-Job" operation of the IPP is performed. The user can complete the print processing by performing a series of operations including the authentication, the job list acquisition, and the release of the job on the operation panel of the printing device.

Now, as described in the above-mentioned conventional example, in order to perform the secured printing, the user has to process, on the operation panel of the printing device, the three steps consisting of the user authentication, the acquisition of the job list issued by himself/herself, and the release (resumption) of the job on hold through designation of the job URI.

That is, as the operations of the IPP, after the authentication, the user issues the "Get-Jobs (job list acquisition)" operation in order to acquire his/her own job URI list, and designates the "Release-Job (resumption of suspended job)" operation with respect to the predetermined job URI on hold.

In this way, the user has to execute each of the above-mentioned three steps in order to realize the secured printing, and complexity in the operations cannot be avoided.

Moreover, usually, the operation panel of the printing device is only provided with an extremely small or minimum necessary operation area for the purpose of reducing cost.

Therefore, there is a problem in that, if the user has to process many operations on the operation panel on the printing device, the user's feeling of use of the printing device is extremely deteriorated.

SUMMARY OF THE INVENTION

It is an object of the present invention to provide a printing system in which the above-mentioned problems are solved.

In addition, it is another object of the present invention to provide an information processing apparatus which can simplify operations on a printing device side by writing job designation information in a detachable storage medium.

Further, it is yet another object of the present invention to provide a printing device which performs user authentication using a detachable storage medium and controls permission to use the printing device.

The above-mentioned objects and other objects of the present invention will be apparent from the following detailed description based upon drawings.

DETAILED DESCRIPTION OF THE PREFERRED EMBODIMENTS

The embodiments of a secured printing system according to the present invention will be described with reference to the accompanying drawings.

Figure 1:
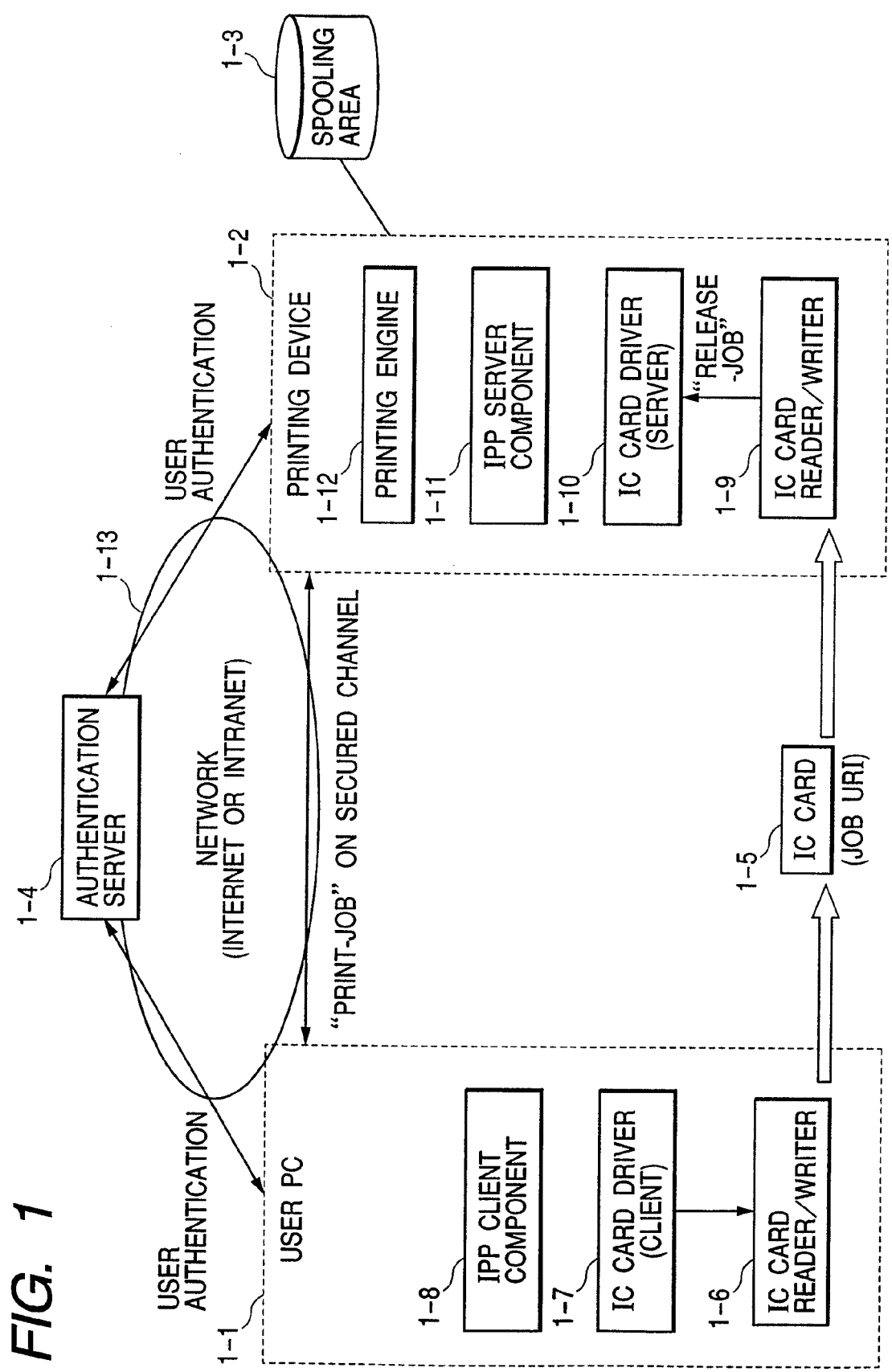
FIG. 1 is a block diagram showing an example of a structure of a secured printing system according to the embodiment of the present invention, to which an information processing apparatus, an authentication server, and a printing device are applicable.

FIG. 1 is a block diagram showing an example of a structure of a secured printing system according to the embodiment of the present invention, to which an information processing apparatus, an authentication server, and a printing device are applicable.

In FIG. 1, reference numeral 1-1 denotes an operation terminal on a user side with which a user using this system performs print processing. More specifically, a personal computer, a workstation, or the like corresponds to the operation terminal on the user side (hereinafter referred to as user PC).

Reference numeral 1-2 denotes a printing device which accepts a print request from a user and actually executes print processing. A so-called network printer, a digital multifunction device which combines a scanner and a printer to realize a copier function through digital image processing, or the like corresponds to the printing device.

A storage device (spooling area) 1-3 for receiving data for printing from the user PC 1-1 and temporarily holding and storing the data, is attached to the printing device 1-2. The printing device 1-2 and the storage device 1-3 are connected by a dedicated cable or an internal bus.

Moreover, the printing device 1-2 is logically connected to a network 1-13 such as the Internet or an Intranet. A network controller (not shown) for accepting print processing through the network 1-13 and an operation panel (not shown) for controlling the printing device when a user directly uses the printing device, are attached to the printing device 1-2.

Reference numeral 1-4 denotes an authentication server, which is a known authentication server for holding and managing authentication information of a user and key information necessary for encryption communication and uniquely authenticating the user who has been registered in advance. The authentication server 1-4 may also have a function as a domain controller. In this case, the authentication server 1-4 plays a central role of constituting a logical group (domain) of users on the network 1-13, controls a right of the registered users to access resources in the domain, or managing security information of each user to provide a secure communication environment in the domain.

Moreover, the authentication server 1-4 may be constituted as a directory server and also have a function of holding and managing access right information of a user to network resources or the like such as authentication information of the user and controlling the information.

Note that, in the case in which the printing device 1-2 directly holds and manages information relating to user authentication, the authentication server 1-4 is unnecessary, and the secured printing system according to the present embodiment may be constituted only by the user PC 1-1 and the printing device 1-2.

In addition, the user PC 1-1, the printing device 1-2, and the authentication server 1-4 are logically connected by the network 1-13 and are constituted such that information can be sent and received remotely among them.

Note that a physical structure of the network 1-13 may be a wired structure or a wireless structure. In addition, it is needless to mention that a plurality of known protocols are used as a communication protocol of the network 1-13.

Reference numeral 1-5 denotes an IC card (smart card) which holds authentication information peculiar to a user and is used for user authentication when the user uses a printing device. Usually, information is held in or read out from the IC card 1-5 by a dedicated IC card reader/writer. In addition, authentication information, key information, and the like peculiar to a user are held in the IC card 1-5. Thus, an advanced encryption processing apparatus for preventing forgery of a card, illegal reading of data, falsification of data, and the like is incorporated in the IC card 1-5.

The user carries the IC card 1-5 with himself/herself and, in using the user PC 1-1 or the printing device 1-2, the user performs user authentication using the IC card 1-5. If the authentication is successful, the user can use the user PC 1-1 or the printing device 1-2. That is, the authentication information peculiar to the user (digital certificate or encryption key) is stored in the IC card 1-5, and authentication information (encryption key) corresponding to the authentication information (encryption key) peculiar to the user is held in the authentication server 1-4.

When the user presents the IC card 1-5 to an apparatus for reading information in the IC card 1-5 (IC card reader/writer described later) or inserts the IC card 1-5 in the apparatus, the apparatus and the authentication server 1-4 communicate with each other through the network 1-13. Then, the authentication information in the IC card 1-5 and the authentication information held in the authentication server 1-4 are calculated according to a predetermined encryption algorithm and, when both pieces of authentication information coincide with each other, the user is regarded as having succeeded in the authentication.

In a process of this authentication processing, the user also needs to input a pass phrase which only the user knows. In using the user PC 1-1 or the printing device 1-2, the user cannot use the device unless the user succeeds in authentication through the above-mentioned process of authentication processing in any case.

Next, internal structures of the user PC 1-1 and the printing device 1-2 will be described.

First, a characteristic internal structure of the user PC 1-1 will be described.

Reference numeral 1-6 denotes an IC card reader/writer, which has functions of accessing the IC card 1-5 carried by a user and reading information held in the IC card 1-5 or writing information in the IC card 1-5.

Reference numeral 1-7 denotes an IC card reader/writer driver on a client side (hereinafter referred to as IC card driver) for controlling the IC card reader/writer 1-6. The IC card driver 1-7 controls the IC card reader/writer 1-6, accesses the IC card 1-5 carried by the user, accesses the authentication server 1-4 based upon the information held in the IC card 1-5 to perform user authentication, and writes information specifying and designating a peculiar job issued by the user (job URI) in a storage area of the IC card 1-5 as described later.

In addition, reference numeral 1-8 denotes an IPP client component (hereinafter referred to as IPP client) for providing a remote print function according to the Internet Printing Protocol (IPP) in the user PC 1-1.

The IC card reader/writer 1-6, the IC card reader/writer driver 1-7, and the IPP client component 1-8 are connected with each other in terms of hardware or software inside of the user PC 1-1 and provide predetermined functions to the user by performing logical data processing.

That is, in the case in which the user wishes to execute printing through a network, the IPP client component 1-8 provides the user with a print operation according to the IPP. More specifically, the IPP client component 1-8 performs processing for issuing a "Print-Job" operation request to an IPP device on the network 1-13 and receiving a response to the operation request. The "Print-Job" operation of the IPP is an operation for generating a print job for a remote IPP device. The IPP client component 1-8 receives job identification information uniquely identifying a print job generated in the IPP device, that is, a job Uniform Resource Identifier (URI; [RFC2396]) as a response. With the IPP, when the "print-Job" operation is issued, the issued print job can be brought into a suspended (hold) state.

In addition, the user is also capable of issuing a plurality of "Print-Job" operations. Job identification information (URI) is issued from the IPP device for each of the plurality of "Print-Job" operations and returned to the IPP client. All of the issued print jobs are held in the IPP server in the same manner as in the case in which a single print job is issued.

The IPP client component 1-8 of the secured printing system according to the present embodiment is constituted such that a print job is automatically issued in the hold state even if the user does not expressly designates this. According to this function, a print is prevented from being outputted before the user goes to the printing device 1-2 to pick the print up, and information of the print is prevented from being leaked.

In addition, other than the above, the IPP operation includes functions of a "Get-Printer-Attributes" operation for acquiring a state of the remote IPP device, a "Print-URI" operation for designating content information to be printed and performing printing with reference to this designated information from the Internet, and the like. The user can execute these operations appropriately as required.

Moreover, the IC card reader/writer driver 1-7 on the client side controls the IC card reader/writer 1-6 physically connected to the user PC 1-1 to perform operation of information. Then, in the case in which the user authenticated by the authentication server 1-4 executes the "Print-Job" with the IPP client component 1-8, the IC card reader/writer driver 1-7 receives job URI information acquired from the IPP device from the IPP client component 1-8 as a response to the execution and further writes the job URI information in the IC card 1-5.

In the case in which a plurality of "Print-Jobs" are executed, there are a plurality of pieces of job URI information issued from the IPP server and acquired. The plurality of pieces of job URI information issued by the same user are written in the IC card 1-5 of the user.

Job-URI information written in the IC card 1-5 is usually deleted after a print job for the Job-URI is finished. However, it is also possible for the user to perform setting such that Job-URI information for a print job for use in reprinting is not deleted after printing is finished. In this case, if a plurality of Job-URIs are stored in an IC card, it is possible to perform setting such that Job-URI information for the respective Job-URI is deleted after printing is finished or to perform setting such that the Job-URI information is not deleted. Consequently, convenience for the user at the time of secured printing is further improved.

Note that as a predetermined storage area of the IC card 1-5 in which job URI information is written, a capacity for allowing a user to write a plurality of pieces of job URI information is secured in advance. Since cost of a card changes depending upon a capacity of the storage area of the IC card 1-5, usually, several options are prepared for the IC card 1-5 according to a storage capacity, and a user can select the IC card 1-5 with a desired capacity.

Note that in the user PC 1-1, a CPU, a ROM, a RAM, a hard disk, a network interface, and the like are provided, though not illustrated in the figure.

In addition, the IC card driver 1-7 and the IPP client 1-8 may be realized in terms of software or hardware by executing a program stored in the hard disk or the like with the CPU of the user PC 1-1.

Next, a characteristic internal structure on the printing device 1-2 side will be described.

Reference numeral 1-9 is an IC card reader/writer attached to the printing device 1-2. The IC card reader/writer 1-9 basically has functions equivalent to those of the IC card reader/writer 1-6 attached to the user PC 1-1, that is, functions of accessing the IC card 1-5 carried by a user, reading information held in the IC card 1-5, and writing information in the IC card 1-5.

In addition, the IC card reader/writer 1-9 is controlled by an IC card driver 1-10 on the server side. The IC card driver 1-10 controls the IC card reader/writer 1-9 to read authentication information peculiar to a user from the IC card 1-5 of the user and accesses the authentication server 1-4 to perform user authentication. These are equivalent to the functions of the IC card driver 1-7 provided in the user PC 1-1.

However, the IC card driver 1-10 is further provided with functions of, in the case in which a job URI is held in the IC card 1-5 of the user, reading out the job URI and designating the job URI to execute the "Release-Job" operation of the IPP. Note that details of the processing sequence will be described later.

Reference numeral 1-11 denotes an IPP server component (hereinafter referred to as IPP server), which provides a function for the printing device 1-2 to accept and process an IPP operation as the IPP device. This IPP server 1-11 accepts a "Print-Job" operation issued by a user and generates a job and, at the same time, temporarily holds this job in the storage device 1-3, generates a job URI for the job, and returns the job URI to the user PC side.

Reference numeral 1-12 denotes a printer engine, which provides a print function itself in the printing device 1-2.

Note that in the printing device 1-2, a CPU, a ROM, a RAM, a hard disk, a network interface, and the like are provided, though not illustrated in the figure.

In addition, the IC card driver 1-10 and the IPP server 1-11 may be realized in terms of software or hardware by executing a program stored in the ROM, the hard disk, or the like with the CPU of the user printing device 1-2.

In this way, the present embodiment relates to a printing device such as a digital multifunction device or a printer having a user authentication function using the IC card 1-5, and more specifically to a mechanism for realizing secured printing in these devices. In addition, the present embodiment also relates to a printing device adapted to the Internet Printing Protocol (IPP), which is an IETF standard, for device control for printing, print job control, or event notification.

A sequent of a series of processing from the "Print-Job" operation after user authentication to writing in an IC card of a job URI will be hereinafter described with reference to FIG. 2.

Figure 2:
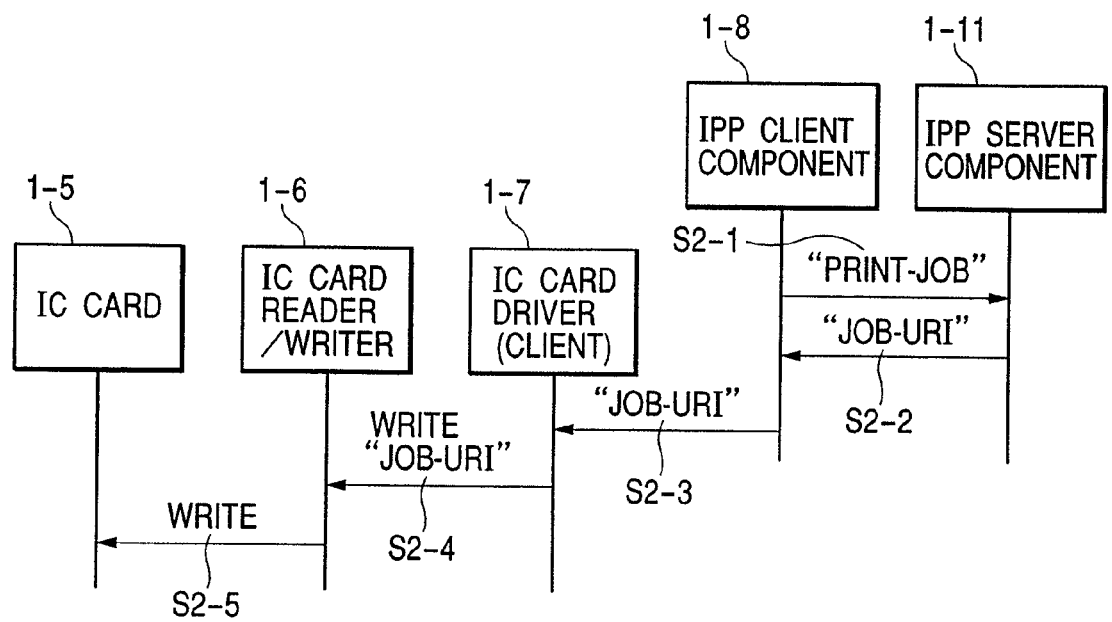
FIG. 2 is a diagram illustrating a series of sequence of processing from a "Print-Job" operation after user authentication to writing of a job URI in an IC card.

FIG. 2 is a diagram illustrating a series of sequence of processing from the "Print-Job" operation after user authentication to writing in an IC card of a job URI. In FIG. 2, components identical with those in FIG. 1 are denoted by the same reference numerals. Note that a series of sequence of processing from S2-1 to S2-5 is processing executed by respective units in the figure.

First, a user issues a print operation, that is, "Print-Job" (S2-1). This processing is executed with respect to the IPP server 1-11 from the IPP client 1-8. As a result, the IPP server 1-11 returns "Job-URI" to the IPP client 1-8 (S2-2).

Then, the IPP client 1-8 communicates the result (Job-URI) to the IC card driver 1-7 (S2-3).

Moreover, the IC card driver 1-7 issues an instruction to write acquired job URI information in the IC card 1-5 (Write "Job-URI") to the IC card reader/writer 1-6 (S2-4).

In response to this, the IC card reader/writer 1-6 executes writing of the job URI in a predetermined storage area of the IC card 1-5 (S2-5).

As described above, a print request ("Print-Job") according to the IPP executed by the user is adapted such that print output is not immediately performed when a job is generated and print data is accepted on the IPP device side. This is for preventing secrecy of print contents from being leaked to an unintended third party because a print is outputted before a user receiving the print reaches the remote IPP device.

In order to realize such a function, in executing the IPP print operation ("Print-Job", etc.), the IPP client 1-8 of the user PC 1-1 designates a "job-hold-until" attribute of the IPP.

The "job-hold-until" attribute provides a function of first bringing a generated print job into a hold state and releasing the job in the hold state according to a value designated in the attribute.

Presently, the following values are specified as values which the "job-hold-until" attribute can take; "no-hold," "indefinite," "day-time," "evening," "night," "weekend," "second-shift," and "third-shift." Note that, since details are described in the IPP standard specifications, descriptions on these values will be omitted here.

Note that, according to the IPP standard specifications, a user may designate any of the above-mentioned values as the "job-hold-until" attribute in executing a print operation. However, the secured printing system according to the present embodiment is constituted such that only a value designated by an administrator in advance becomes valid.

This setting is designated by the administrator in the IPP client 1-8.

Basically, setting is performed such that a job maintains a hold state until a "Release-Job" IPP operation described later is designated ("job-hold-until"="indefinite").

It is assumed here that the IC card 1-5 is provided with a storage capacity necessary and sufficient for holding a plurality of pieces of job URI information of a user.

Now, the print job issued as described above is sent to the printing device 1-2 through the network 1-13, and the print data is further held in the data storage device 1-3 attached to the printing device 1-2.

As described above, since the job is held in the hold state, it is never printed and outputted immediately. Note that, as described above, the encryption communication according to the TLS is applied to the network 1-13 connecting the user PC 1-1 and the printing device 1-2, and secrecy of print data or the like is maintained.

A series of sequence until a user resumes printing after finishing authentication in the printing device 1-2 will be hereinafter described with reference to FIG. 3.

Figure 3:
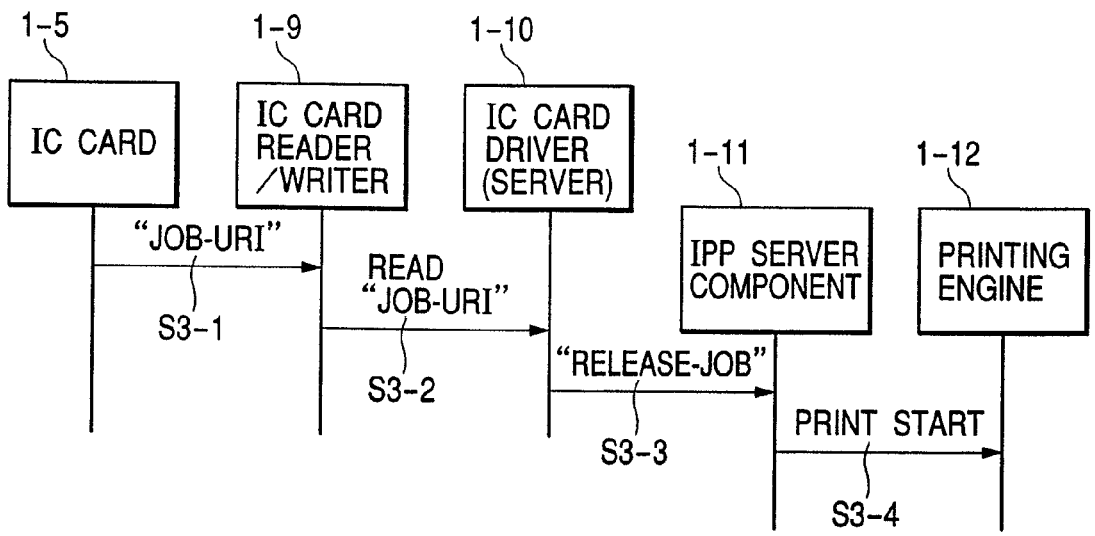
FIG. 3 is a diagram illustrating a series of sequence of processing until printing is resumed after a user finishes authentication in a printing device.

FIG. 3 is a diagram illustrating a series of sequence until a user resumes printing after finishing authentication in the printing device 1-2. In FIG. 3, components identical with those in FIG. 1 are denoted by the identical reference numerals. Note that a series of sequence from S3-1 to S3-4 is processing executed by respective units in the figure.

Here, the user inserts the IC card 1-5 which the user himself/herself possesses in the IC card reader/writer 1-9 of the printing device 1-2 and performs necessary authentication procedures such as inputting a pass phrase. Since the procedures for user authentication are as described above, detailed descriptions thereof will be omitted. An operation sequence after the user authentication is successful will be described with reference to FIG. 3.

First, in the case in which job URI information (Job-URI) concerning the job issued by the user is held in the IC card 1-5, the IC card reader/writer 1-9 reads this job URI information (S3-1). This processing is actually performed by the IC card driver 1-10 executing a read operation (Read "Job-URI") with respect to the IC card reader writer 1-9 (S3-2).

That is, when the user inserts the IC card 1-5 in the IC card reader/writer 1-9 of the printing device 1-2, the IC card reader/writer 1-9 generates an interrupt signal informing the IC card driver 1-10 that the IC card 1-5 has been inserted. Then, in response to this interrupt signal, the IC card driver 1-10 executes user authentication processing. When the user authentication is successful, thereafter, the IC card driver 1-10 starts processing for continuously reading the job URI information stored in the IC card 1-5.

In this way, in the case in which job URI information (Job-URI) is stored in the IC card 1-5, job URI data (Job-URI) can be acquired through S3-1 and S3-2. On the other hand, in the case in which job URI information is not stored in the IC card 1-5, the sequence fails and the subsequent processing is not executed.

In the case in which the IC card driver 1-10 acquires job URI information of the user in this way, the IC card driver 1-10 continuously designates this job URI to automatically issue a "Release-Job" operation of the IPP to the IPP server 1-11 (S3-3). In many cases, the "Release-Job" operation is implemented as an IPP client component. However, in the secured printing system according to the present embodiment, the function of the IC card driver 1-10 is adapted such that this "Release-Job" operation can be issued.

Then, the IPP server 1-11 accepts the "Release-Job" operation, retrieves the designated job URI, and releases the job in the hold state.

"Print Start" is issued to the printer engine 1-12 from the IPP server 1-11 (S3-4), the released job is immediately processed as an active print job, and print output is performed.

Note that, in the case in which the printing device 1-2 accepts print jobs from a plurality of users, since job URIs different for each user are allocated to the IPP server 1-11, job URIs never overlap among the users.

In addition, a user holds job URI information necessary for a print job of the user in the IC card 1-5, it is unnecessary to retrieve a job of the user on the operation panel of the printing device 1-2 again. This means that processing in which a user issues a "Get-Jobs" operation of the IPP from an operation panel of a printing device in the past is unnecessary any more. Then, since the IC card driver 1-10 automatically issues "Release-Job" with success of user authentication as a trigger, the user does not need to expressly designate this operation. That is, the user can automatically resume a print job of the user and perform print output simply by inserting the IC card 1-5 possessed by himself/herself in the printing device 1-2 and inputting necessary authentication information (pass phrase).

Moreover, in the case in which the print job ends normally, the job URI information held in the IC card 1-5 and the print job and the print data held in the IPP printing device 1-2 are completely deleted. This is for preventing an unauthorized user illegally accessing the IC card 1-5 or the printing device 1-2 to steal print information.

In this way, in the secured printing system according to the present embodiment, a job URI of a user is held in an IC card, and the user does not have to expressly designate a job URI. That is, since a printing device can see in advance which job should be printed, it becomes unnecessary for the user to execute "Get-Jobs" again to acquire the job URI of the user held in the IC card as in the past.

Moreover, if the job URI is held in the IC card at the time of user authentication in the printing device, since it is evident that the user resumes executing the print job, it is possible to constitute an IC card driver so as to automatically issue "Release-Job" when the user has succeeded in the authentication. Therefore, it becomes also unnecessary for the user to expressly issue the "Release-Job" operation.

From the above, the printing device according to the present embodiment can automate the two IPP operations of "Get-Jobs" and "Release-Job" completely, and it becomes possible to give the user a feeling as if printing is resumed only through the authentication step.

Moreover, according to the secured printing system according to the present embodiment, it becomes possible for a user to perform remote printing through a secure network in printing a confidential document. Then, since the confidential document is not outputted until the user directly goes to a printing device, confidentiality of the document is kept completely.

In addition, in the case in which the user wishes to resume a print job on hold with a printing device to which the print job has been sent, the user only has to set an IC card that holds user authentication information owned by himself/herself in the printing device according to the present embodiment and to execute necessary user authentication procedures. That is, it becomes unnecessary for the user to perform the operation of acquiring a job URI of himself/herself from a panel of the printing device ("Get-Jobs") and designating resumption of the job on hold ("Release-Job") after the authentication procedures in the printing device. Consequently, user operability of the printing device can be remarkably improved in performing secured printing.

Moreover, since user authentication using an IC card is performed in both a user PC and a printing device, injustice such as pretending of an operator or illegal use of the printing system by a user who picked up an IC card or the like can be prevented.

A series of processing procedures relating to print processing of the printing system having the information processing apparatus and the printing device in the present embodiment will be hereinafter described with reference to a flow chart of FIG. 4.

Figure 4:
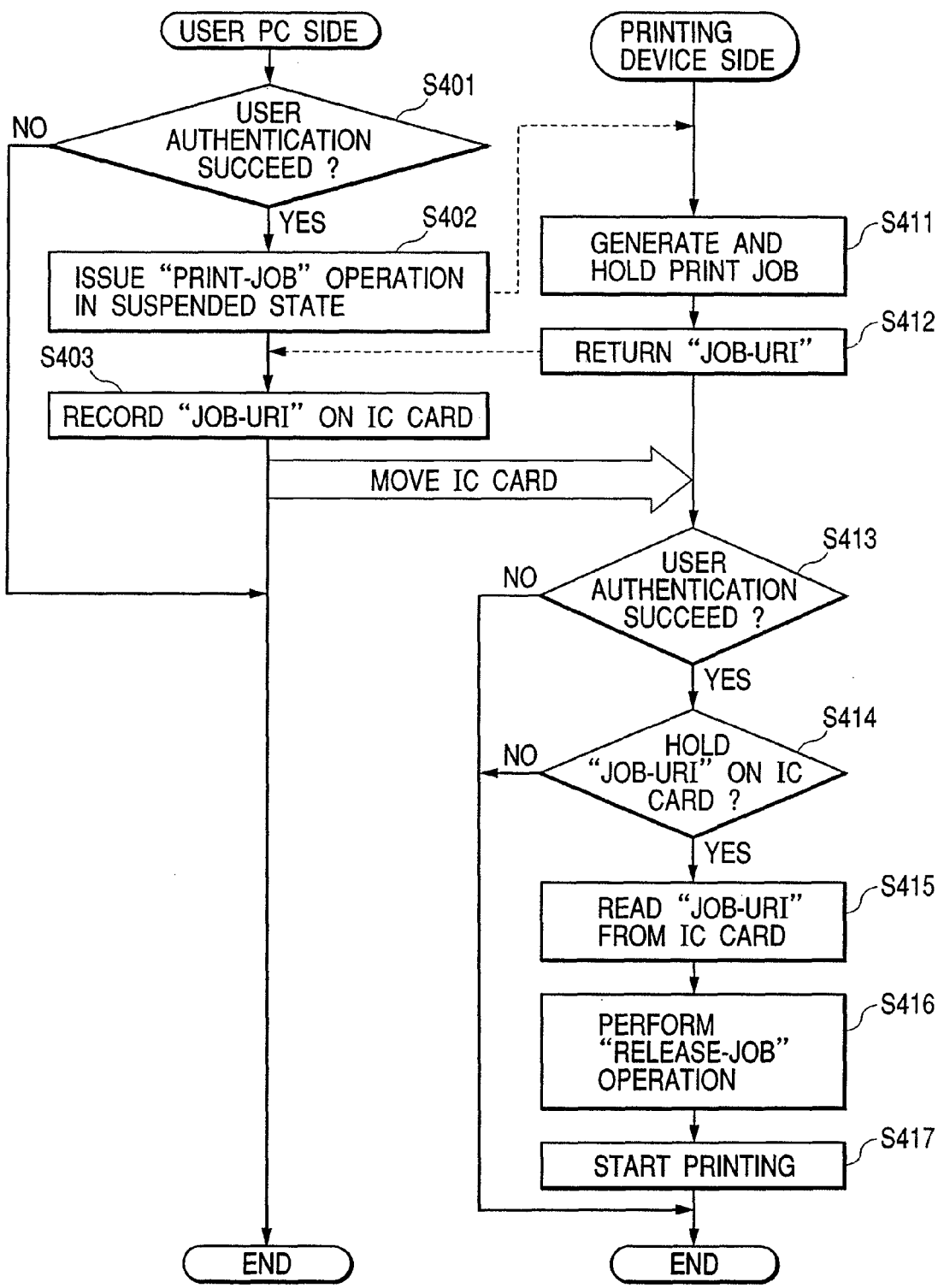
FIG. 4 is a flow chart showing an example of a series of processing procedures relating to print processing of a printing system to which an information processing apparatus and a printing device according to the present invention are applicable.

FIG. 4 is a flow chart showing an example of the series of processing procedures relating to the print processing of this printing system. Note that S401 to S403 and S411 to S417 indicate respective steps.

The user inserts the IC card 1-5 in the IC card reader/writer 1-6, causes the IC card reader/writer 1-6 to read authentication information in the IC card 1-5, inputs a pass phrase, and performs authentication processing with the authentication server 1-4 according to the authentication information and the pass phrase (S401) and, if the authentication fails, ends the processing directly.

On the other hand, in the case in which the user succeeds in authentication by the authentication server 1-4, a print operation, that is, a "Print-Job" operation is issued from the IPP client 1-8 to the IPP server 1-11 in a suspended state according to an instruction of the user from an operation unit (not shown) of the user PC 1-1 (S402). That is, the print operation is issued with "indefinite" designated as a value of the "job-hold-until" attribute. However, since this designation is automatically performed according to setting of an administrator or the like, the user does not need to be conscious of the designation.

When this "Print-Job (suspended state)" operation is received on the print server 1-2 side, the IPP server 1-11 generates a print job based upon the "Print-Job" operation and, at the same time, puts the print job on hold to store and hold it in the storage device 1-3 (S411). Then, the IPP server 1-11 returns "Job-URI" of the print job to the IPP client 1-8 (S412).

Then, the IPP client 1-8 communicates the result (Job-URI) to the IC card driver 1-7, and the IC card driver 1-7 writes acquired job URI information in the IC card 1-5 with the IC card reader/writer 1-6 (S403) and ends the processing.

It is assumed here that the print job specified by "Job-URI" may be held on a server on the network (not shown) other than the storage device 1-3. In this case, "Job-URI" becomes information specifying the server on the network and a position of the print job in the server.

Next, the user inserts the IC card 1-5 having stored therein authentication information of the user and job URI information in the card reader/writer 1-6 of the printing device 1-2, causes the card reader/writer 1-6 to read the authentication information in the IC card 1-5, inputs a pass phrase, and performs authentication processing by the authentication server 1-4 according to the authentication information and the pass phrase (S413) and, if the authentication fails, ends the processing directly.

On the other hand, if the user has succeeded in the authentication by the authentication server 1-4 in step S413, next, the user judges whether or not job URI information (Job-URI) concerning a job issued by the user is held in the IC card 1-5 (S414) and, if the job URI information is not held, ends the processing directly.

In contrast, if the job URI information (Job-URI) concerning the job issued by the user is held in the IC card 1-5, the IC card driver 1-10 causes the IC card reader/writer 1-9 to read the job URI information (S415).

Next, the IC card driver 1-10 designates this job URI and automatically issues a "Release-Job" operation of the IPP to the IPP server 1-11 (S416).

Then, the IPP server 1-11 accepts the "Release-Job" operation, retrieves a designated job URI, releases a job in the hold state, and issues "Print Start" to the printer engine 1-12 from the IPP server 1-11. Then, print output is started by the printer engine 1-12 (S417).

In this way, when job URI information of an IPP job issued by a user is held in an IC card (smart card) possessed by the user, the IC card (smart card) is inserted in a printing device and, when user authentication is successful, if a job URI is held in the IC card, the IC card designates the job URI and automatically issues "Release-Job".

In addition, a job is issued (in conformity with a "job-hold-until" attribute) according to the Internet printing Protocol (IPP), the job URI is held in a smart card in a device (user PC, etc.) which has issued the job. When the smart card is inserted in a printer and user authentication is successful, the IC card designates a job URI held in advance and automatically issues "Release-Job" to execute printing.

Consequently, a job URI list is not displayed on an operation panel and, when the user succeeds in authentication, "Release-Job" of the IPP operation is immediately issued.

Note that, although the case in which "indefinite" is designated as a value of the "job-hold-until" attribute is described above, the value may be other values such as "daytime," "evening," "night," and "weekend".

Then, it is structured such that a job suspended and held in the printing device 1-2 is valid until a deadline designated in the above-mentioned "job-hold-until" attribute value and, when the deadline has passed, the job is automatically deleted by the IPP server 1-11.

In addition, the deadline designated in the "job-hold-until" attribute value can be set and changed on the user PC by an administrator or the like.

Note that the present invention is applicable whether a printer engine is a laser beam system, an electrophotographic system (e.g., LED system) other than the laser beam system, a liquid crystal shutter system, an ink-jet system, a thermal transfer system, a sublimation system, or other print system.

From the above, with the printing system in which the user PC 1-1 which issues a print job, the printing device 1-2 which receives the print job and executes print processing, and the authentication server 1-4 which manages information for uniquely authenticating a user and performs processing required in authentication processing are connected via the network 1-13, authentication information peculiar to the user is held, and an IC card to be used when the user uses the user PC 1-1 and the printing device 1-2 is provided; the user PC 1-1 designates a job suspension attribute for a print job and issues the print job to the printing device 1-2, and acquires peculiar job designation information (Job-URI) which is returned as a result of print job issue and acceptance processing of the printing device 1-2 and writes the job designation information in the IC card 1-5 which is used when the user uses the printing device. If the user succeeds in user authentication and peculiar job designation information is held in the IC card 1-5, the printing device 1-2 automatically designates the peculiar job designation information to issue a job release request in the print job issue and acceptance processing. Consequently, user operations at the time of execution of remote printing can be reduced, and usability in the printing device can be improved.

Next, a series of processing procedures in the case in which a user issues a plurality of print jobs will be hereinafter described with reference to a flow chart of FIG. 6.

Figure 6:
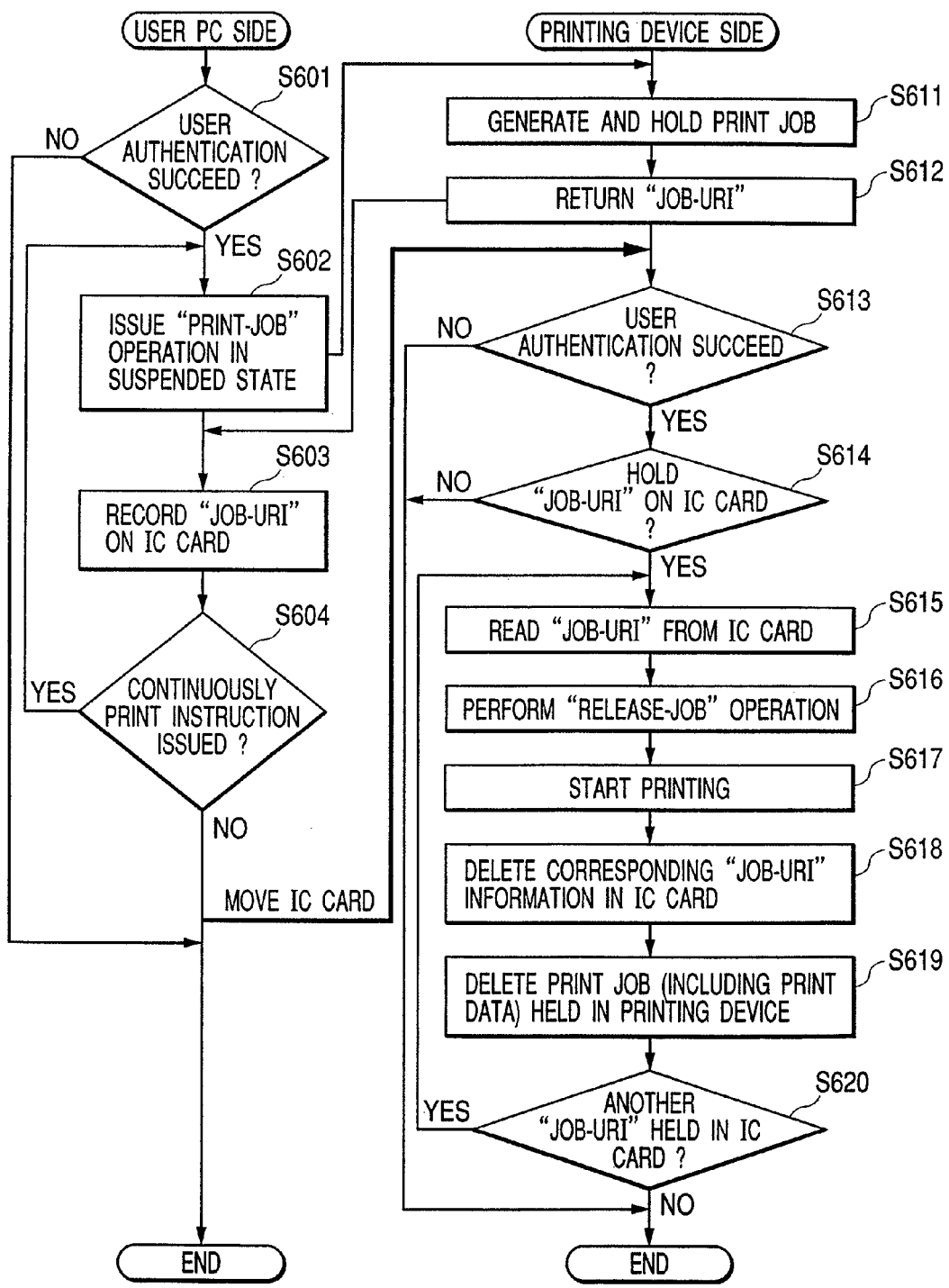
FIG. 6 is a flow chart showing an example or a series of processing procedures relating to a plurality of print processing of the printing system to which the information processing apparatus and the printing device according to the present invention are applicable.

FIG. 6 is a flow chart showing an example of a series of processing procedures relating to a plurality of print processing of this printing system. Note that S601 to S604 and S611 to S620 indicate respective steps.

The user inserts the IC card 1-5 in the IC card reader/writer 1-6, causes the IC card reader/writer 1-6 to read authentication information in the IC card 1-5, inputs a pass phrase, and performs authentication processing with the authentication server 1-4 according to the authentication information and the pass phrase (S601) and, if the authentication fails, ends the processing directly.

On the other hand, in the case in which the user succeeds in authentication by the authentication server 1-4, a print operation, that is, a "Print-Job" operation is issued from the IPP client 1-8 to the IPP server 1-11 in a suspended state according to an instruction of the user from a operation unit (not shown) of the user PC 1-1 (S602). That is, the print operation is issued with "indefinite" designated as a value of the "job-hold-until" attribute. However, since this designation is automatically performed according to setting of an administrator or the like, the user does not need to be conscious of the designation.

When this "Print-Job (suspended state)" operation is received on the print server 1-2 side, the IPP server 1-11 generates a print job based upon the "Print-Job" operation and, at the same time, puts the print job on hold to store and hold it in the storage device 1-3 (S611). Then, the IPP server 1-11 returns "Job-URI" of the print job to the IPP client 1-8 (S612).

Then, the IPP client 1-8 communicates the result (Job-URI) to the IC card driver 1-7, and the IC card driver 1-7 writes acquired job URI information in the IC card 1-5 with the IC card reader/writer 1-6 (S603).

It is possible for the user to designate printing of a plurality of documents and obtain prints later all together. After the user issues a print job and job URI information is written in the CI card 1-5 (S603), it is judged whether the user continuously instructs printing (S604). In the present embodiment, the judgment on whether or not the user continuously instructs printing (S604) is performed according to judgment on whether or not the user has pulled out the IC card 1-5 from the IC card reader/writer 1-6. When the IC card 1-5 is pulled out from the IC card reader/writer 1-6, since a valid session of user authentication ends, print instruction after that cannot be performed. Therefore, the printing system in the present embodiment is capable of judging whether or not printing is continuously instructed according to this operation. When the IC card 1-5 is pulled out from the IC card reader/writer 1-6, the printing system judges that printing is not continuously instructed and ends the processing.

On the other hand, while the user keeps the IC card 1-5 inserted in the IC card reader/writer 1-6, since use by the qualified user is continuing, it is likely that the user executes the print processing again at arbitrary timing. The printing system according to the present embodiment checks out the two conditions that, when the user issues a print job again, the IC card 1-5 is inserted in the IC card reader/writer 1-6, and shifts to step S602 again.

Note that, as the judgment step on whether or not printing is continuously instructed (S604), a system of displaying a dialog on the display of the user PC 1-1 and causing the user to make judgment is possible other than the above-mentioned embodiment.

Next, a processing flow on the printing device side will be hereinafter described with reference to FIG. 6.

When this "Print-Job (suspended state)" operation is issued on the user PC side and is received on the print server 1-2 side, the IPP server 1-11 generates a print job based upon the "Print-Job" operation and, at the same time, puts the print job on hold to store and hold it in the storage device 1-3 (S611). Then, the IPP server 1-11 returns "Job-URI" of the print job to the IPP client 1-8 (S612). A state of transmission of the "Print-Job" operation and the "Job-URI" information is as shown by broken lines in FIG. 6.

The IPP client 1-8 existing on the user PC side communicates the result (Job-URI) to the IC card driver 1-7, and the IC card driver 1-7 writes obtained job URI information in the IC card 1-5 with the IC card reader/writer 1-6 (S603) to end the processing.

Next, the user inserts the IC card 1-5 having stored therein authentication information of the user and job URI information in the card reader/writer 1-6 of the printing device 1-2, causes the card reader/writer 1-6 to read the authentication information in the IC card 1-5, inputs a pass phrase, and performs authentication processing by the authentication server 1-4 according to the authentication information and the pass phrase (S613) and, if the authentication fails, ends the processing directly. At this point, printing is not executed.

In the printing system according to the present embodiment, in order to make secrecy of print data firm in the printing device 1-2, in the case in which user authentication in the authentication server 1-4 has failed for a predetermined number of times or more, the printing device 1-2 does not accept user authentication thereafter and the print data held in the storage area in the suspended state is physically deleted automatically. Consequently, secrecy for print information of the user is protected more firmly.

On the other hand, if the user has succeeded in the authentication by the authentication server 1-4 in step S613, next, the user judges whether or not job URI information (Job-URI) concerning a job issued by the user is held in the IC card 1-5 (S614). Here, if the job URI information is not held, the user ends the processing directly.

If the job URI information (Job-URI) concerning the job issued by the user is held in the IC card 1-5, the IC card driver 1-10 causes the IC card reader/writer 1-9 to read the job URI information (S615).

Next, the IC card driver 1-10 designates this job URI and automatically issues a "Release-Job" operation of the IPP to the IPP server 1-11 (S616).

Then, the IPP server 1-11 accepts the "Release-Job" operation, retrieves a designated job URI, releases a job on the hold state, and issues "Print Start" to the printer engine 1-12 from the IPP server 1-11. Then, print output is started by the printer engine 1-12 (S617).

In this way, when job URI information of an IPP job issued by a user is held in an IC card (smart card) possessed by the user, the IC card (smart card) is inserted in a printing device and, when user authentication is successful, if a job URI is held in the IC card, the IC card designates the job URI and automatically issues "Release-Job".

In addition, a job is issued (in conformity with a "job-hold-until" attribute) with the Internet printing Protocol (IPP), the job URI is held in a smart card in a device (user PC, etc.) which has issued the job and, when the smart card is inserted in a printer and user authentication is successful, the IC card designates a job URI held in advance and automatically issues "Release-Job" to execute printing.

Consequently, a job URI list is not displayed on an operation panel and, when the user succeeds in authentication, "Release-Job" of the IPP operation is immediately issued.

Note that, although the case in which "indefinite" is designated as a value of the "job-hold-until" attribute is described above, the value may be other values such as "daytime," "evening," "night," and "weekend."

It is structured such that a job suspended and held in the printing device 1-2 is valid until a deadline designated in the above-mentioned "job-hold-until" attribute value and, when the deadline has passed, the job is automatically deleted by the IPP server 1-11.

In addition, the deadline designated in the "job-hold-until" attribute value can be set and changed by an administrator or the like on the user PC.

Now, after the printing is completed, the "Job-URI" information in the IC card 1-5 becomes unnecessary. The "Job-URI" information is completely deleted in order to prevent a person who is not authorized to access print information from accessing the job designation information illegally and acquiring the print information illegally. Deletion of information is processed by the IC card driver 1-10. Usually, since a nonvolatile storage device is incorporated as the storage area in the IC card 1-5, deletion of information is realized by overwriting of NULL data or overwriting of random data (S618).

Note that, with respect to Job-URI information which is set so as not to be deleted after printing, the Job-URI information is not deleted but stored and held in the IC card as it is. The user can perform reprinting easily by performing such setting with respect to a print job which is required to be printed again after printing.

A print job held in the printing device 1-2 or the data storage device 1-3 and print data in the print job are also physically deleted completely at a stage where printing is completed in the same manner as the job designation information. The physical deletion means overwriting all sectors in which data is held with NULL or random data as opposed logical deletion for deleting only sector table information (so-called FAT information) holding data. (S619)

Note that, since print data corresponding to the Job-URI information which is set not to be deleted after printing is print data which is required to be printed again, the print data is stored and held in the IC card as it is. In that case, it is safer if print data is encrypted using key information peculiar to the user stored in the IC card 1-5 and, then, stored and held in the printing device 1-2 or the data storage device 1-3.

Note that each processing of deletion of "Job-URI" information in the IC card 1-5 (S618) and deletion of print job and print data held in the printing device (including data storage device) (S619) may be held in the printing device intentionally with an object of reusing (reprinting) a print job because of a product structure. In order to realize a reprinting function of a print job, it is necessary to authenticate a user's right to reprint print data (access control) strictly, and a mechanism for user authentication for that purpose should be provided.

For example, in a central management system of user information using a directory server, kerberos authentication, NTLM authentication of Microsoft Windows® or the like is used as well, whereby more firm user authentication and access control are possible.

Now, after printing ends for one print job and processing is completed, in the case in which another "Job-URI" information is held in the IC card 1-5, print processing is continuously performed based upon the next "Job-URI" information. This judgment is performed by the IC card driver 1-10 and the IPP server component 1-11 (S620).

The IC card driver 1-10 judges whether or not a plurality of pieces of "Job-URI" information are held in the IC card 1-5. Then, if the "Job-URI" information is held in the IC card 1-5, next, the IPP server component 1-11 checks whether or not a print job corresponding to the "Job-URI" information is held in the printing device 1-2 or the data storage device 1-3. If the print job is held without inconsistency, the processing flow proceeds to S615 again, and print processing is performed.

In the case in which "Job-URI" information is not held or the case in which "Job-URI" information in the IC card 1-5 and a suspended print job in the printing device 1-2 or the data storage area 1-3 are inconsistent, the processing on the printing device side is finished without executing printing.

Note that, in order to make confidentiality for print information more firm, in the case in which "Job-URI" information in the IC card 1-5 and a suspended print job in the printing device 1-2 or the data storage area 1-3 are inconsistent, "Job-URI" information in the IC card 1-5 may be deleted.

It is needless to mention that, in the printing system according to the present embodiment, the present invention is applicable whether a printer engine is a laser beam system, an electrophotographic system (e.g., LED system) other than the laser beam system, a liquid crystal shutter system, an ink-jet system, a thermal transfer system, a sublimation system, or other print system.

A configuration of a data processing program, which can be read by the printing system to which the information processing apparatus and the printing device according to the present embodiment are applicable, will be described with reference to a memory map shown in FIG. 5.

Figure 5:
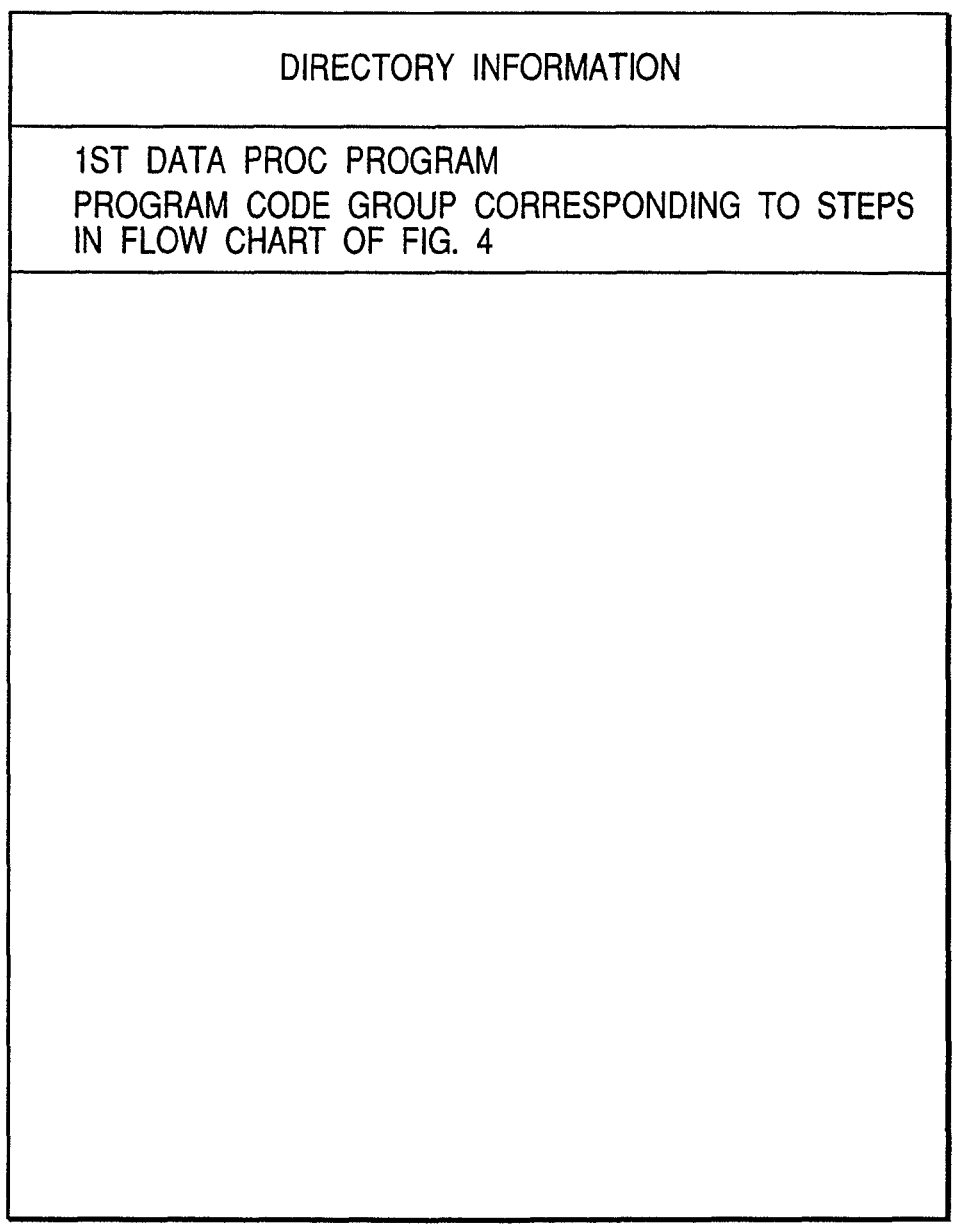
FIG. 5 is a schematic diagram illustrating a memory map of a storage medium storing various data processing programs which can be read by a printing system to which the information processing apparatus and the printing device according to the present invention are applicable.

FIG. 5 is a schematic diagram illustrating a memory map of a storage medium storing various data processing programs which can be read by a printing system to which the information processing apparatus and the printing device according to the present invention are applicable.

Note that, although not specifically illustrated, information for managing a program group stored in a storage medium, for example, version information, a creator, and the like may be stored, and information depending upon an OS or the like on a program reading side, for example, an icon or the like for identifying to display a program may be stored.

Moreover, data subordinate to the various programs is also managed in the directory. In addition, in the case in which a program or data to be installed is compressed, a program or the like for decompressing the program or data may be stored.

The functions shown in FIG. 4 in the present embodiment may be performed by a host computer according to a program to be installed from the outside. Then, in that case, the present invention is also applicable to the case in which an information group including a program is supplied to an output device by a storage medium such as a CD-ROM, a flash memory, or an FD, or from an external storage medium via a network.

It is needless to mention that, as described above, the objects of the present invention are attained if a storage medium having stored therein a program code for software for realizing the functions of the embodiment is supplied to a system or an apparatus, and a computer (or CPU or MPU) of the system or the apparatus reads out to execute the program code stored in the storage medium.

In this case, the program code itself read out from the storage medium realizes a new function of the present invention, and the storage medium having stored therein the program code constitutes the present invention.

As the storage medium for supplying the program code, for example, a floppy disk, a hard disk, an optical disk, a magnetooptical disk, a CD-ROM, a CD-R, a DVD-ROM, a magnetic tape, a nonvolatile memory card, a ROM, an EEPROM, a silicon disk, or the like can be used.

In addition, it is needless to mention that the present invention includes not only the case in which the functions of the embodiment are realized by the computer executing the read out program code but also the case in which an operating system (OS) or the like running on the computer performs a part or all of actual processing based upon an instruction of the program code and the functions of the embodiment are realized by the processing.

Moreover, it is needless to mention that the present invention includes the case in which the program code read out from the storage medium is written in a memory provided in a function extending board inserted in the computer or a function extending unit connected to the computer and, then, based upon an instruction of the program code, a CPU or the like provided in the function extending board or the function extending unit performs a part or all of actual processing, and the functions of the embodiment are realized by the processing.

In addition, the present invention may be applied to a system constituted by a plurality of devices or may be applied to an apparatus consisting of one device. Further, it is needless to mention that the present invention can be applied to the case in which the present invention is attained by supplying a program to a system or an apparatus. In this case, a storage medium having stored therein a program represented by software for attaining the present invention is read out to the system or the apparatus, whereby it becomes possible for the system or the apparatus to enjoy the effects of the present invention. Moreover, a program represented by software for attaining the present invention is downloaded and read out from a database on a network by a communication program, whereby it becomes possible for the system or the apparatus to enjoy the effects of the present invention.

As described above, according to the present embodiment, when an information processing apparatus issues a print job to a printing device in a suspended state, in the case in which a print job to be issued from the information processing apparatus is in the suspended state, the printing device side suspends and holds print processing until suspension of job processing is released, and returns job designation information peculiar to the print job to the information processing apparatus. The information processing apparatus side writes peculiar job designation information of the print job returned from the printing device in a detachable storage medium. Next, in the case in which peculiar job designation information of the suspended print job is stored in the detachable storage medium, the printing device side reads out the job designation information, issues an instruction for releasing suspension of job processing and, upon the release of suspension of job processing, executes print processing of the print job held in the suspended state, whereby troublesome user operations at the time of remote printing can be reduced and usability can be improved while securing confidentiality of a print. In addition, since authentication processing is executed using an authentication server, an effect is realized in that other users are prevented from using their IC cards to willfully execute others' print jobs.

Although the present invention has been described based upon the preferred embodiment, the present invention is not limited to this, and various modifications are possible within a scope indicated in claims.

What is claimed is:

1. An information processing apparatus that issues a print job to an external apparatus via a network, comprising:
    a reader that reads out data from a detachable storage medium;
    a print job issuing unit that issues a print job to said external apparatus;
    an authentication controller that, in the case in which user authentication based upon authentication information peculiar to a user read by said reader is successful, performs control such that issuance of a print job by said job issuing unit is made possible; and
    a writer that writes job designation information peculiar to the print job, which is returned from said external apparatus according to the issuance of the print job by said print job issuing unit, in the detachable storage medium.

2. An information processing apparatus according to claim 1, wherein
    said print job issuing unit issues a plurality of print jobs, and
    said reader writes job designation information peculiar to each of the plurality of print jobs, that are returned from said external apparatus according to the issuance of the plurality of print jobs by said print job issuing unit, in the detachable storage medium.

3. An information processing apparatus according to claim 1, wherein said print job issuing unit uses the Internet Printing Protocol as a communication procedure in print job issue and acceptance processing.

4. An information processing apparatus according to claim 1, wherein the job designation information includes a Job-URI specifying the print job.

5. An information processing apparatus according to claim 1, wherein said authentication controller inquires success or failure of user authentication from an authentication server, with which said authentication controller can communicate via the network, according to the authentication information peculiar to the user.

6. An information processing apparatus according to claim 5, wherein
    said information processing apparatus has a password input unit which inputs a password peculiar to the user, and
    said authentication controller inquires success or failure of user authentication from said authentication server according to the authentication information peculiar to the user read out from the detachable storage medium and the password peculiar to the user inputted by said password input unit.

7. An information processing apparatus that issues a print job to an external apparatus via a network, comprising:
    a print job issuing unit that issues a print job to said external apparatus; and
    a writer that writes a Job-URI specifying the print job, which is returned from said external apparatus according to the issuance of the print job by said print job issuing unit, in the detachable storage medium.

8. A control method for an information processing apparatus that issues a print job to an external apparatus via a network, comprising:
    a reading step of reading authentication information peculiar to a user from a detachable storage medium;
    an authenticating step of, in the case in which user authentication based upon authentication information peculiar to the user read in said reading step is successful, performing control such that issuance of a print job is made possible;
    a print job issuance step of issuing a print job to the external apparatus based upon the control in said authenticating step; and
    a writing step of writing job designation information peculiar to the print job returned from the external apparatus in response to issuance of the print job, into the detachable storage medium.

9. A control method for an information processing apparatus that issues a print job to an external apparatus via a network, comprising:
    a reading step of reading authentication information peculiar to a user from a detachable storage medium;
    a print job issuance step of issuing a print job to the external apparatus; and
    a writing step of writing a Job-URI specifying the print job returned from the external apparatus in response to issuance of the print job, into the detachable storage medium.

10. A computer-readable storage medium storing a program for executing a control method for an information processing apparatus that issues a print job to an external apparatus network, said control method comprising:
    a reading step of reading authentication information peculiar to a user from a detachable storage medium;
    an authenticating step of, in the case in which user authentication based upon authentication information peculiar to the user read in said reading step is successful, performing control such that issuance of a print job is made possible;
    a print job issuance step of issuing a print job to the external apparatus based upon the control in said authenticating step; and
    a writing step of writing job designation information peculiar to the print job returned from the external apparatus in response to issuance of the print job, in the detachable storage medium.

11. A computer-readable storage medium storing a program for executing a control method for an information processing apparatus that issues a print job to an external apparatus via a network, said control method comprising:
    a reading step of reading authentication information peculiar to a user from a detachable storage medium;
    a print job issuance step of issuing a print job to the external apparatus; and
    a writing step of writing a Job-URI specifying the print job returned from the external apparatus in response to issuance of the print job, into the detachable storage medium.

* * * * *